(12) United States Patent
Drescher et al.

(10) Patent No.: US 11,080,018 B2
(45) Date of Patent: Aug. 3, 2021

(54) FLOATING POINT CONSTRAINT SOLVING WITH HOLES

(71) Applicant: SAP SE, Walldorf (DE)

(72) Inventors: Conrad Drescher, Mannheim (DE); Claudia Moeller, Ubstadt-Weiher (DE)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 16/410,111

(22) Filed: May 13, 2019

(65) Prior Publication Data
US 2020/0364030 A1   Nov. 19, 2020

(51) Int. Cl.
*G06F 7/483* (2006.01)

(52) U.S. Cl.
CPC ................... *G06F 7/483* (2013.01)

(58) Field of Classification Search
CPC ..................................................... G06F 7/483
See application file for complete search history.

(56) References Cited

U.S. PATENT DOCUMENTS

| | | | | |
|---|---|---|---|---|
| 8,190,406 B2* | 5/2012 | Beckman | ............... | G06F 30/00 703/2 |
| 2005/0198621 A1* | 9/2005 | Tillmann | ............ | G06F 11/3624 717/128 |
| 2010/0198901 A1* | 8/2010 | Bagley | ................... | G06F 17/11 708/495 |
| 2012/0215731 A1* | 8/2012 | Junker | .................. | G06N 7/005 706/47 |
| 2014/0143604 A1* | 5/2014 | Li | ....................... | G06F 11/3684 714/38.1 |
| 2019/0042215 A1 | 2/2019 | Berg et al. | | |

\* cited by examiner

*Primary Examiner* — Michael D. Yaary
(74) *Attorney, Agent, or Firm* — Fish & Richardson P.C.

(57) ABSTRACT

The disclosure generally describes methods, software, and systems for defining a constraint satisfaction problem including floating point variables. Floating-point domains are described using a notation that allows arbitrarily many ranges denoted by at least one of intervals with boundary information or singleton values comprising fully discrete domains. Mathematically correct results are computed using closures combined with interval arithmetic. A new consistency level for constraint propagation is provided, including multi-bounds consistency, over floating point variables, where the multi-bounds consistency achieves domain consistency over monotonic functions.

15 Claims, 5 Drawing Sheets

FLOATING POINT CONSTRAINT SOLVING WITH HOLES

BACKGROUND

The present disclosure relates to solving constraint satisfaction problems. Constraint solvers are tools that can be used to solve constraint satisfaction problems, for example, by combining some form of backtracking search with constraint propagation. During propagation, values that cannot be part of any solution are removed.

SUMMARY

This disclosure generally describes computer-implemented methods, software, and systems for defining a constraint satisfaction problem including floating point variables. One computer-implemented method includes: describing floating-point domains using a notation that allows arbitrarily many ranges denoted by at least one of intervals with boundary information or singleton values comprising fully discrete domains; computing mathematically correct results using closures combined with interval arithmetic; and providing a new consistency level for constraint propagation, including multi-bounds consistency, over floating point variables, where the multi-bounds consistency achieves domain consistency over monotonic functions.

The foregoing and other implementations can each optionally include one or more of the following features, alone or in combination. In particular, one implementation can include all the following features:

In a first aspect, combinable with any of the previous aspects, further including defining assignments to singletons and tight intervals with open bounds.

In a second aspect, combinable with any of the previous aspects, further including assigning and excluding real numbers not representable by floating point numbers, represented as tight intervals with open bounds.

In a third aspect, combinable with any of the previous aspects, further including excluding intervals with arbitrary boundary types and singleton values.

In a fourth aspect, combinable with any of the previous aspects, further including restricting domains of floating points variables that are mathematically correct and independent of an underlying floating point library as long as the floating point library provides rounding control as required for interval arithmetic.

In a fifth aspect, combinable with any of the previous aspects, further including providing a notation library that include notations that are part of a constraint definition language, including symbols for representing variable domains consisting of multiple intervals with open and closed bounds.

In a sixth aspect, combinable with any of the previous aspects, further including providing, for presentation to a user, the new type of restricted variable domains that are computed using a library for constraint solving over floating point numbers.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
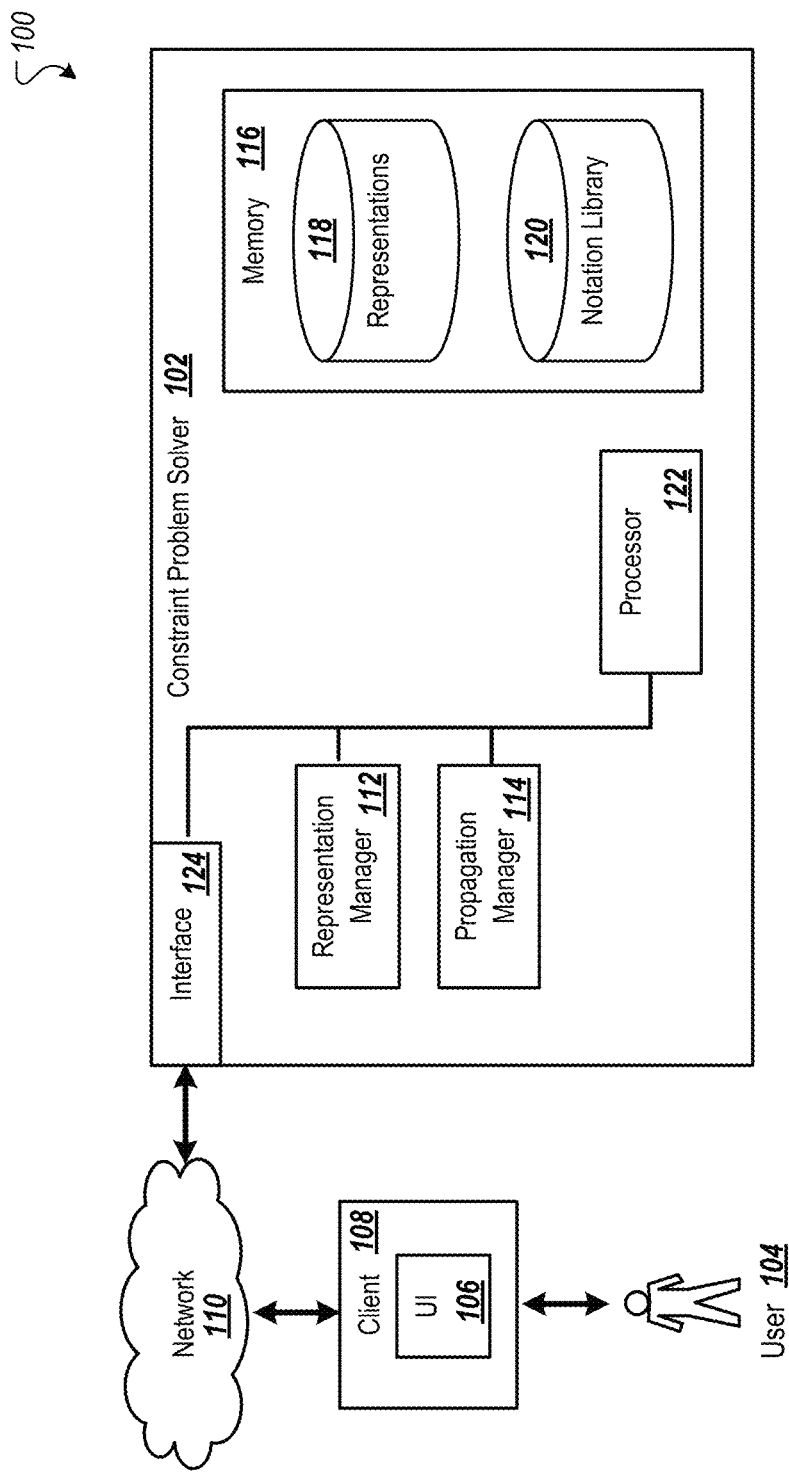
FIG. 1 is a block diagram of an example environment that includes a constraint problem solver.

This disclosure generally describes computer-implemented methods, software, and systems for defining a constraint satisfaction problem including floating point variables.

Conventional constraint solvers have limitations. For example, one limitation of conventional constraint solvers for constraints over variables with floating point domains may be typically representing float domains as one closed interval. Using constraint propagation, only the domain bounds can be checked. Constraints that forbid values somewhere in between the bounds are "lazy" meaning that they fire only in the case of a forbidden assignment, causing the search to backtrack.

Another disadvantage of conventional constraint solvers is that domain bounds are always assumed to be included. That is, open bounds cannot be represented, as shown in an example: the constraint $x<y$ for float variables x with domain [a ... b] and y with domain [c ... d] where $c<a$ and $d<b$. A correct result would be [a ... d) for x and (a ... d] for y. In this nomenclature, square brackets represent closed bounds (where the domain range includes the respective bound), and rounded parentheses represent open bounds (where the domain range excludes the respective bound). But the best representation that conventional constraint solvers can provide is [a ... d] for x and [a ... d] for y. In this representation, there is no difference between $x<y$ and $x<=y$. The deficiency can be detected when assigning the excluded values. For the present example, one could also define the restricted domain to be [a ... nextbefore(b)] for x and [nextafter(a) ... d] for y, where nextbefore and nextafter return the adjacent floating point number of the underlying floating point data type (such as a "double" in C++). However, then one has also discarded the real numbers between a and nextafter(a), which is mathematically incorrect. The repeated execution of such overeager domain restrictions can, in extreme cases, lead to the identification of inconsistencies (empty variable domains) for equations that are mathematically solvable. This drawback is avoided by the representation with the boundary types. Conventional constraint solvers avoid accumulating such errors of rounding inwards by using interval arithmetic (rounding lower bounds downwards and upper bounds upwards in computations). The algorithms presented in this disclosure also follow an interval arithmetic approach, which is further combined with the representation and computation of open bounds and holes in variable domains.

In the case of variant configuration, the constraint solver is not used to search a complete solution to the underlying constraint solving problem. If this were the case, forbidden values would be detected during the search. Instead, only constraint propagation is performed. Therefore, excluded values which do not meet the domain boundaries can be displayed to the user, and the model becomes inconsistent if the user chooses them, leading to poor user guidance during a configuration session. Hence, for interactive product configuration, stronger propagation algorithms are needed that can exclude arbitrary values from domains and that can represent the correct boundary type. Moreover, the general problem domain of constraint solving with search can benefit from more extensive propagation since having fewer values that need to be considered decreases the size of a search tree.

The present disclosure describes techniques for overcoming deficiencies of conventional constraint solver techniques. Specifically, the techniques can be used for constraint solving over floating point numbers, including representing holes in domains and boundary types. As an example, float variables can carry boundary information, in order to represent open, closed, and half-open intervals. The boundary information makes it possible to exclude boundaries without discarding valid solutions.

Further, variable domains can consist of subranges, with each subrange representing either discrete values or intervals represented by a lower bound and an upper bound. The bounds can again carry the information whether or not they are part of the interval. Using these variable domains, it is possible to represent, in the domain, the exclusion of a discrete value or an interval from the domain.

In conventional constraint solvers, a variable can count as being assigned if the variable is either a literal (e.g., 1.0) or a tight interval (e.g., [1.0, nextafter(1.0)]), where both bounds are included, as are all bounds. Using the approaches in the present disclosure, the notion of a tight interval can be refined to (A,nextafter(A)), with both bounds excluded. Then the same definition of an assigned variable can be reused (discrete value or tight interval). In a conventional constraint solver, neither the discrete values nor tight intervals can be excluded from a variable domain. With the newly-introduced notion of variable assignment, and by treating the infinite number of real numbers belonging to such tight intervals, assignments can be excluded from the domain of some other variable. That is, if there exists a constraint X not-equal Y, where X has a domain [L–U], and Y is assigned to (A,nextafter(A)) with L<A<U, then X can be refined to [L–A], [nextafter(A)–U].

Using the techniques of the present disclosure, new floating point domains can also represent completely discrete domains such as {1.2, 2.6, 3}. If, for example, a previously-unconstrained variable is constrained to take its discrete values from a table, then the discrete domain can be represented exactly. The exact representation makes it much easier for the end-user to pick one of the three legal values then the representation using the closed interval [1.2-3].

For constraint propagation (e.g., filtering variable domains), the notion of "support" is central. A variable value can be considered to have support if the value occurs in a solution to the constraint that respects the domains of the other variables mentioned by the constraint. For variables with domains that contain open bounds, the notion of support can be defined as follows. If the constraint is defined by the function y=f(x), then a value of y has support in x if the value of y is the image of some value in the closure of x (where the closure of x's domain is obtained by turning all open bounds into closed ones). Additionally, a value in x has support if x's image is in the closure of y. In other words, when computing the filtered domain of one variable, the open bounds in the other variables' domains are treated as closed.

This use of closures in the computation can correctly take into account the real numbers between discrete floats in computations. For example, assume that for a value a, the image f(a) is a real number r, and further assume that y has a domain [nextbefore(r), r+1]. When the closure [nextbefore(r), r+1] is not considered, the value a has no support in y, which is mathematically wrong. In this case, the value a would be falsely excluded. When considering the closure instead, one might not exclude a value b for which holds f(b)=nextbefore(r), but this is not crucial because the inconsistency would be detected upon assigning b.

Based on this notion of support, a new propagation level "multi-bounds consistency" is introduced. This notion can extend the well-known propagation level bounds consistency to variable domains that consist of multiple ranges. A check whether or not the values have support for propagation is performed not only for the maximum and minimum values of the whole domain, but the check is also performed for the minimum and maximum value of each range of the domain. For constraints representing monotonous functions, achieving multi-bounds consistency amounts to achieving domain consistency, something which is typically only achieved by constraint solvers for integer variables. The algorithm for achieving multi-bounds consistency works as described next. Let x, y be floating point variables for a constraint problem and let y=f(x) for some function f that is piecewise invertible. All computations use the current (or updated) state of a variable's domain. The following algorithm steps can be used. First, the domain of x is restricted to the area of definition of f (one-time check). Second, the image of f(x) is computed (using the closure of x's domain) and intersected with y's domain. Third, the part of the domain of x that maps to the closure of y is computed (often this will be the inverse function image $f^{-1}(y)$), and x's domain is restricted to this part of the domain. The second and third steps are repeated until: 1) no more change occurs, 2) one of the variable domains becomes empty (inconsistency detected), or 3) the constraint becomes trivially true (for example, for y=sin(x) when both variable domains only contain zero).

The generalization of the above algorithm to functions on more than one argument or relations is straightforward and omitted for simplicity of exposition. For certain functions, especially periodic ones, the third step of the algorithm is not straightforward. The algorithm handles this as follows. To determine an appropriate inverse function, ranges $x_i$ in the domain of x are determined such that $f(x_i)$ has a unique inverse function $f_i^{-1}$. Next, compute for all i the sets $f_i^{-1}(z)$ where z equals y restricted to the definition area of $f_i^{-1}$. Note that for monotonous functions, this can be computed by only considering the multi-bounds of z. For every range $z_k$ of z, if $f^{-1}$ is monotonously increasing, determine $a_{k,i}:=f_i^{-1}(\min(z_k))$ and $b_{k,i}:=f_i^{-1}(\max(z_k))$ (vice versa if $f^{-1}$ is monotonously decreasing). Then, $f^{-1}(y)$ is given by the union of the intervals $[a_{k,i}, b_{k,i}]$. Then, x is restricted to its intersection with the union of these sets.

The techniques of the present disclosure can be used for implementing a new library for constraint solving over floating point numbers. This library can cover functionality including, but not restricted to, basic relations (=, >, . . . . ), arithmetic, trigonometric functions, and table constraints. More generally, any function meeting the requirements of the multi-bounds-consistency algorithm can be used. This library can be used for computing the restricted variable domains which are displayed to end-users, for example, in interactive product configuration tools.

FIG. 1 is a block diagram of an example environment 100 that includes a constraint problem solver 102. The constraint problem solver 102 can be used, for example, by a user 104 for solving constraint problems, for example in the context of interactive product configuration. The user 104 can use or interact with a user interface (UI) 106. The UI 106 can be associated with one or more applications that run on a client 108 (e.g., a mobile device, laptop computer, or other computing device) to interact with the constraint problem solver 102. A network 110 (for example, the Internet) can support communication among the components of the environment 100.

The constraint problem solver 102 includes a representation manager 112 that can be used to represent floating point variables with their domains and constraints on these. The representation manager 112 can make it possible to assign and exclude real numbers not representable by floating point numbers, exclude intervals with arbitrary boundary types, and restrict domains of floating points variables that are mathematically correct and independent of an underlying floating point data type as long as the type provides rounding control (upwards/downwards), as required by interval arithmetic. For example, the representation manager 112 can be used to represent domain bounds in representations, such as x=[a . . . d) and y=(a . . . d], which provide "multi-bounds consistency" for a particular problem. The representation manager 112 can be used to describe and handle floating-point domains using a notation that allows arbitrarily many ranges denoted by intervals with boundary information. The representations can define assignments to singletons and tight intervals with open bounds.

A propagation manager 114 can be used for constraint propagation in which values that cannot be part of any solution are removed from a domain. For example, constraint propagation for the constraint x<y for float variables x with domain [a . . . b] and y with domain [c . . . d] will update x's and y's domain to x=[a . . . d) and y=(a . . . d]. The propagation manager 114 is responsible for ensuring that all constraints are made multi-bounds-consistent and that all constraints are notified of changes to their variables' domains.

The constraint problem solver 102 includes a memory 116 that can store representations 118 of constraint problems that use notations from a notation library 120. The representations 118 can include representations for variable domains such as x=[a . . . d) and y=(a . . . d], for example, that include open, half-open, and closed intervals. The representations 118 can make it possible to provide a new consistency level for constraint propagation, called multi-bounds consistency, over floating point variables, where the multi-bounds consistency achieves domain consistency over monotonic functions. The notation library 120 can include notations that are part of a constraint definition language. This language can include symbols for representing constraints as basic relations, arithmetic functions, table constraints, etc. on the variables provided by the representation manager.

The constraint problem solver 102 includes an interface 124 for receiving inputs (for example, value assignment requests or domain restrictions) and for transmitting responses. A processor 122 can execute instructions of modules and other components of the constraint problem solver 102.

Figure 2A:
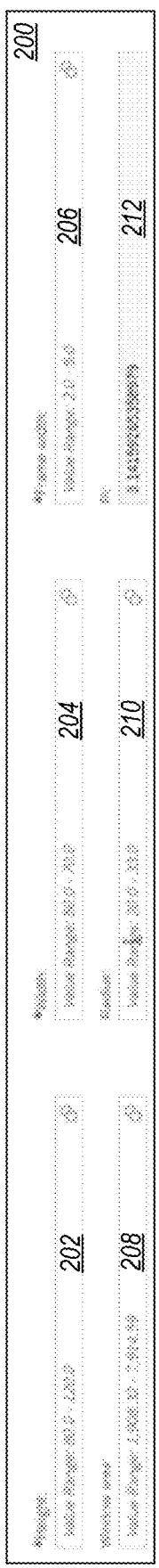
FIGS. 2A-2D are screenshots of examples of a data entry area that incorporates ranges of valid values for data fields.
Figure 2B:
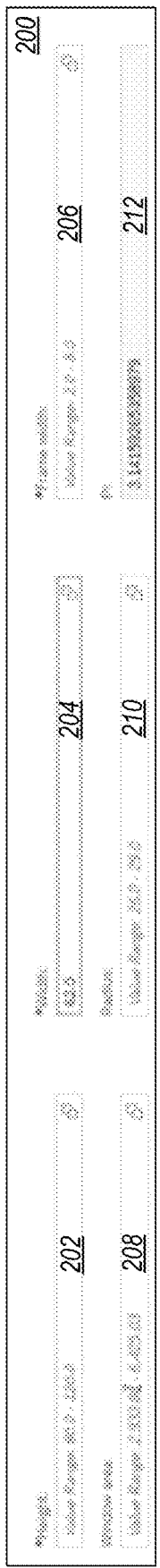
Figure 2C:
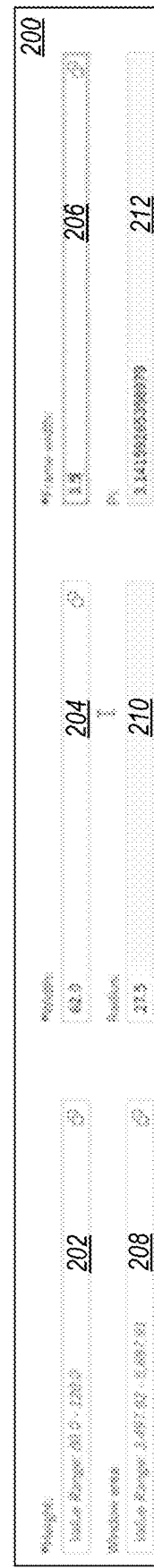
Figure 2D:
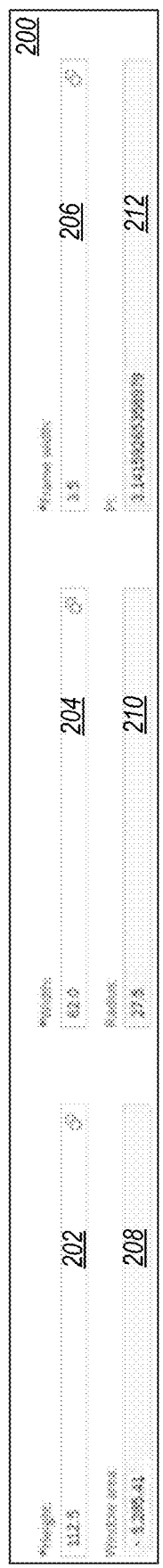

FIGS. 2A-2D are screenshots of examples of a data entry area 200 that incorporates ranges of valid values for data fields 202-212. Values entered in the data fields 202-212 and the resulting changes in other data fields 202-212 illustrate, for example, how the results of constraint propagation may be displayed in user interfaces. The values also indicate how the constraints' results may change over time under various conditions. For example, some of the data fields 202-212, if not yet defined, can include a description identifying a range of values that are valid entries in a particular field, depending on values entered in other ones of the data fields 202-212. The values of the fields 202-212 shown in FIG. 2A can represent a state in which the data entry area 200 is initially presented, for example, with no values entered for the data fields 202-210 Referring to FIG. 2B, upon entry of 62.0 in the data field 204, the description changes for the ranges of values that are now valid for the data fields 208 and 210. Referring to FIG. 2C, upon entry of 3.5 in the data field 206, the only possible value for the data field 210 is filled in, and the range of values that are now valid for the data field 208 has changed. Referring to FIG. 2D, upon entry of 112.5 in the data field 202, the only possible value for the data field 208 is filled in. FIGS. 2A-2D show an example of a user interface for displaying constraint propagation results.

Figure 3A:
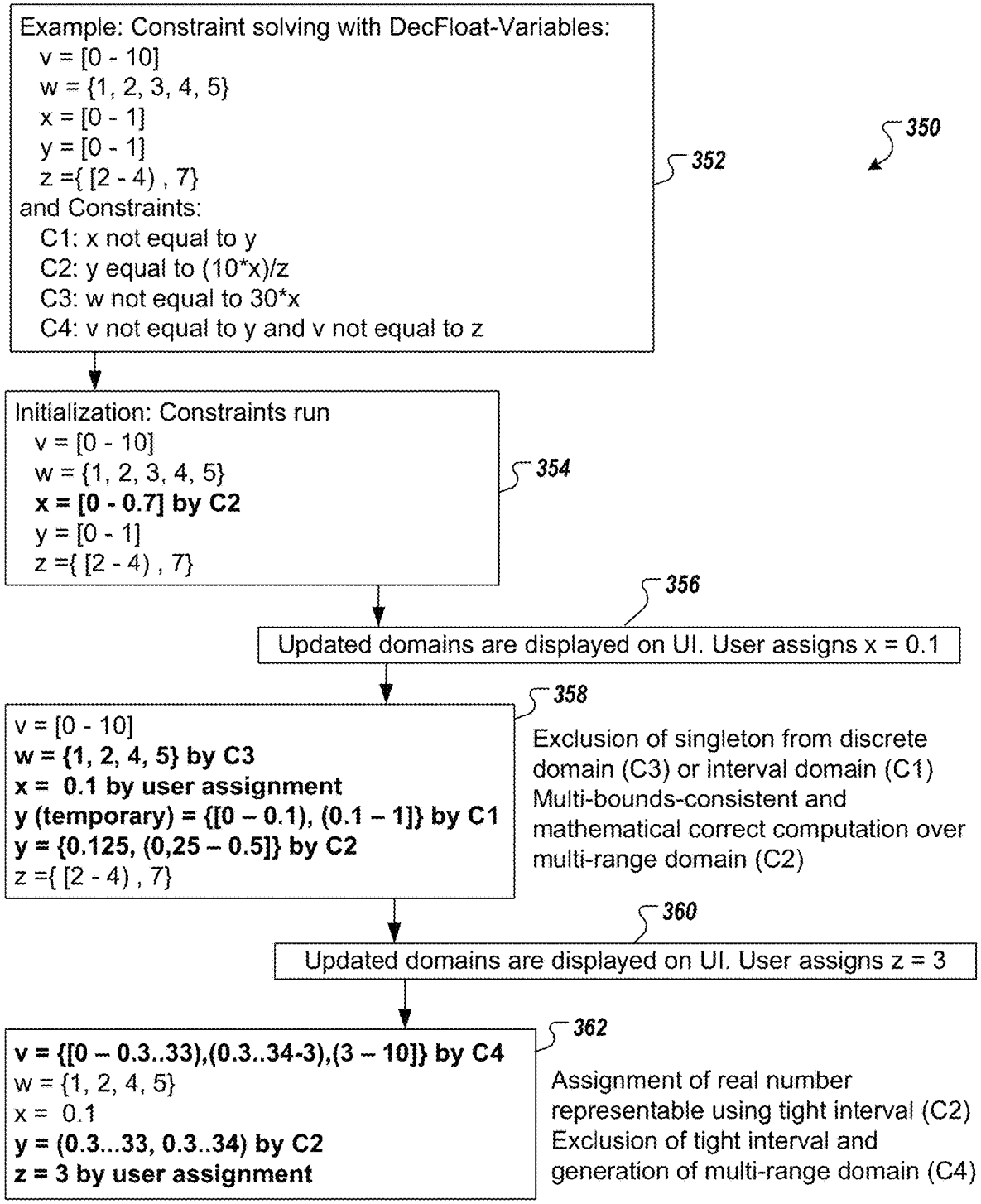
FIG. 3A is a flowchart of an example interaction with the floating point constraint solver illustrating major points of the disclosure.

FIG. 3A is a flowchart of an example interaction 350 with the floating point constraint solver illustrating major points of the disclosure.

At 352, floating point variables v, w, x, y, z with associated domains are created (for the sake of illustration, an IEEE'754 decimal float implementation is assumed as basic type). The domains consist of discrete values, intervals with boundary types, and a mixture thereof. Also constraints on these variables are entered into the constraint model, but not yet solved.

At 354 the constraints are solved, resulting in updated variable domains. If the constraint solver is used in an interactive product configurator, for example, where the variables are product characteristics, and the constraints describe the feasible combinations, then the results of steps 352 and 354 are presented to the end user when the product model is first loaded.

At 356, a user chooses a discrete assignment for a variable.

At 358, the constraints are solved showing the exclusion of discrete values both from intervals and domains consisting only of discrete values. The example also shows how all the bounds of a variable's domain are correctly reflected by multi-bounds consistency. The results are again displayed to the user at 360.

At 362, the next user assignment triggers constraint solving. This results in the computation of one-third as a tight interval with excluded bounds (counting as an assigned value). The same step includes a constraint excluding this tight interval from the domain of another variable and shows how the number of ranges in a variable's domain can both increase and decrease over time.

Figure 3B:
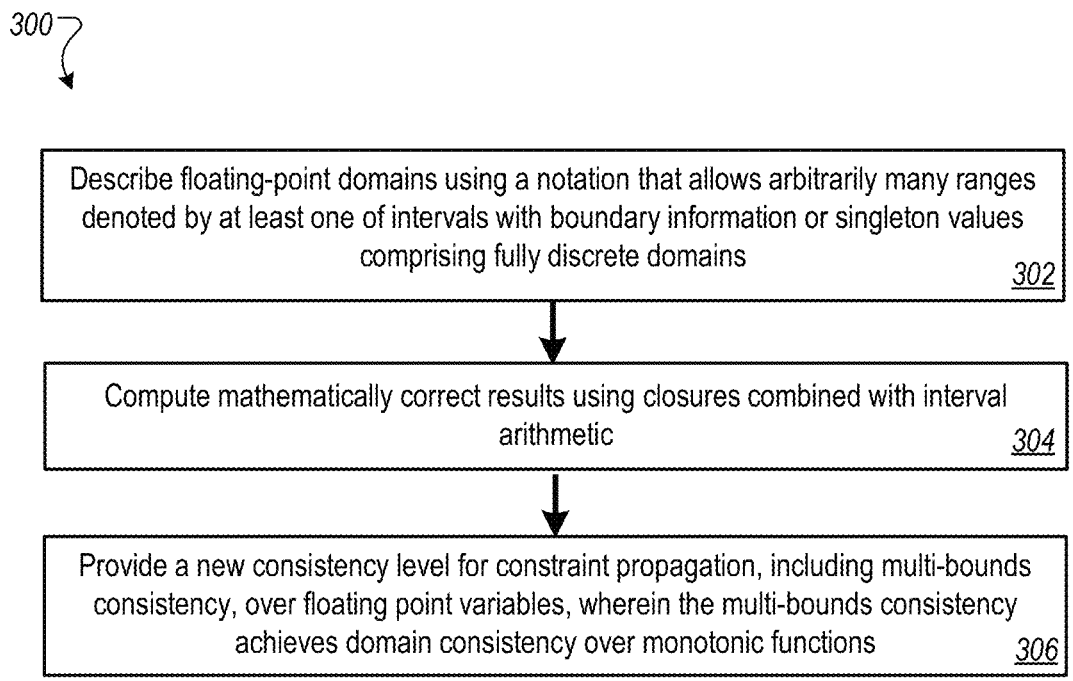
FIG. 3B is a flowchart of an example method for supporting floating point constraint solving.

FIG. 3B is a flowchart of an example method 300 for supporting floating point constraint solving. Method 300 can be performed by the constraint problem solver 102, for example. For clarity of presentation, the description that follows generally describes method 300 in the context of FIG. 1.

At 302, floating-point domains are described using a notation that allows arbitrarily many ranges denoted by at least one of intervals with boundary information or singleton values comprising fully discrete domains. For example, the constraint problem solver 102 can be used for defining ranges that use notations such as shown in FIG. 3A.

At 304, mathematically correct results are computed using closures combined with interval arithmetic. For example, during propagation, the constraint problem solver 102 can achieve mathematically correct results because of the notations and definitions that are made possible by the representations 118 and the notation library 120. The mathematical correctness can include, for example, assigning and excluding real numbers not representable by floating point numbers, excluding intervals with arbitrary boundary types, and restricting domains of floating points variables that are mathematically correct and independent of an underlying floating point library.

At 306, a new consistency level is provided for constraint propagation, including multi-bounds consistency, over floating point variables, where the multi-bounds consistency achieves domain consistency over monotonic functions. The notations and definitions that are provided by the representations 118 and the notation library 120 can provide a level of consistency for constraint problems handled by the constraint problem solver 102. As an example, FIG. 3A illustrates the new propagation consistency level, multi-bounds consistency, for constraint propagation over floating point variables; FIGS. 2A-2D show an example of a user interface.

Figure 4:
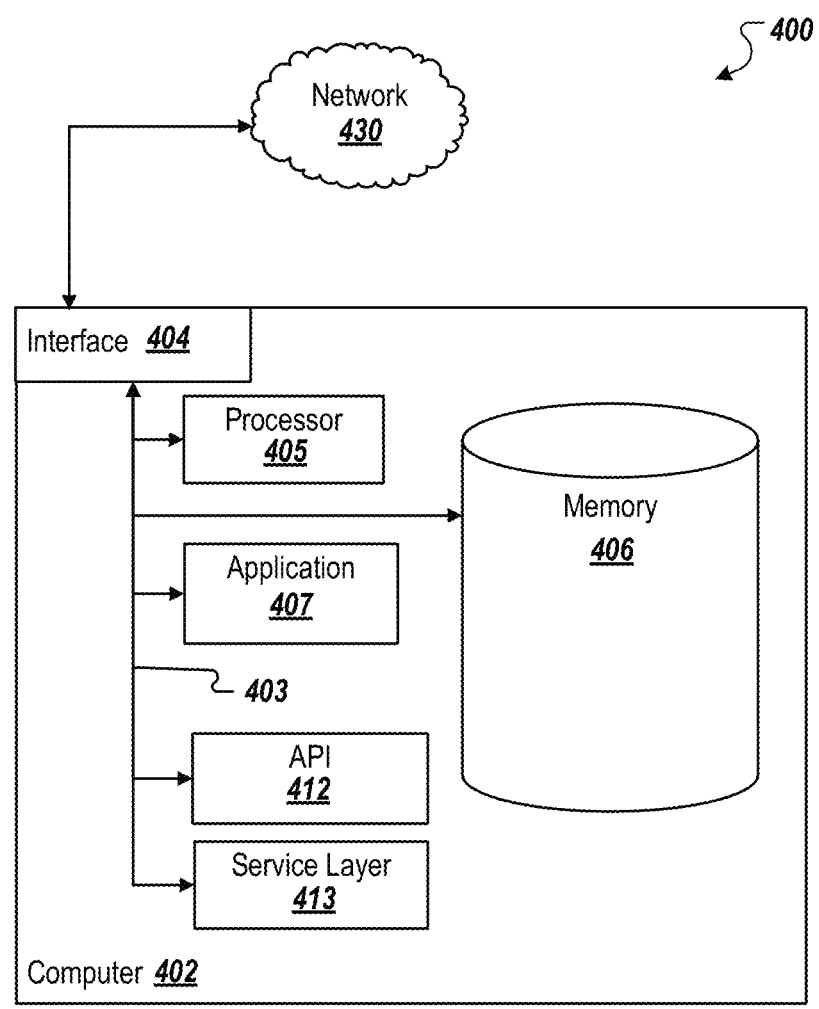
FIG. 4 is a block diagram of an example of a computer system used to provide computational functionalities associated with described algorithms, methods, functions, processes, flows, and procedures as described in the instant disclosure.

FIG. 4 is a block diagram of an example of a computer system 400 used to provide computational functionalities associated with described algorithms, methods, functions, processes, flows, and procedures as described in the instant disclosure.

The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an API 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of the instant disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a GUI. The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for defining a constraint satisfaction problem including floating point variables, comprising:

providing, by a constraint problem solver, a notation library that includes notations that are part of a constraint definition language, the notation library including symbols for representing variable domains consisting of multiple intervals with open and closed bounds;

describing, by a representation manager of the constraint problem solver, floating-point domains using notations of the notation library, the notations allowing arbitrarily many ranges denoted by at least one of intervals with boundary information or at least one set of discrete values;

computing, by a propagation manager of the constraint problem solver, mathematically correct results using closures combined with interval arithmetic;

providing, by the propagation manager, a new consistency level for constraint propagation, including multi-bounds consistency over floating point variables, wherein the multi-bounds consistency achieves domain consistency over monotonic functions; and presenting, by the constraint problem solver and to a user, new types of restricted variable domains associated with the mathematically correct results in a graphical user interface.

2. The computer-implemented method of claim 1, further comprising defining assignments to singletons and tight intervals with open bounds.

3. The computer-implemented method of claim 1, further comprising assigning and excluding real numbers not representable by floating point numbers, represented as tight intervals with open bounds.

4. The computer-implemented method of claim 1, further comprising excluding intervals with arbitrary boundary types and singleton values.

5. The computer-implemented method of claim 1, further comprising restricting domains of floating points variables that are mathematically correct and independent of an underlying floating point library as long as the floating point library provides rounding control as required for interval arithmetic.

6. A system comprising:

memory storing tables storing cases associating problems and solutions, and metadata identifying the use of the cases over time; and a server performing operations comprising:

providing, by a constraint problem solver, a notation library that includes notations that are part of a constraint definition language, the notation library including symbols for representing variable domains consisting of multiple intervals with open and closed bounds;

describing, by a representation manager of the constraint problem solver, floating-point domains using notations of the notation library, the notations allowing arbitrarily many ranges denoted by at least one of intervals with boundary information or at least one set of discrete values;

computing, by a propagation manager of the constraint problem solver, mathematically correct results using closures combined with interval arithmetic;

providing, by the propagation manager, a new consistency level for constraint propagation, including multi-bounds consistency over floating point variables, wherein the multi-bounds consistency achieves domain consistency over monotonic functions; and presenting, by the constraint problem solver and to a user, new types of restricted variable domains associated with the mathematically correct results in a graphical user interface.

7. The system of claim 6, the operations further comprising defining assignments to singletons and tight intervals with open bounds.

8. The system of claim 6, the operations further comprising assigning and excluding real numbers not representable by floating point numbers, represented as tight intervals with open bounds.

9. The system of claim 6, the operations further comprising excluding intervals with arbitrary boundary types and singleton values.

10. The system of claim 6, the operations further comprising restricting domains of floating points variables that are mathematically correct and independent of an underlying floating point library as long as the floating point library provides rounding control as required for interval arithmetic.

11. A non-transitory computer-readable media encoded with a computer program, the program comprising instructions that when executed by one or more computers cause the one or more computers to perform operations comprising:

providing, by a constraint problem solver, a notation library that includes notations that are part of a constraint definition language, the notation library including symbols for representing variable domains consisting of multiple intervals with open and closed bounds;

describing, by a representation manager of the constraint problem solver, floating-point domains using notations of the notation library, the notations allowing arbitrarily many ranges denoted by at least one of intervals with boundary information or at least one set of discrete values;

computing, by a propagation manager of the constraint problem solver, mathematically correct results using closures combined with interval arithmetic;

providing, by the propagation manager, a new consistency level for constraint propagation, including multi-bounds consistency over floating point variables, wherein the multi-bounds consistency achieves domain consistency over monotonic functions; and presenting, by the constraint problem solver and to a user, new types of restricted variable domains associated with the mathematically correct results in a graphical user interface.

12. The non-transitory computer-readable media of claim 11, the operations further comprising defining assignments to singletons and tight intervals with open bounds.

13. The non-transitory computer-readable media of claim 11, the operations further comprising assigning and excluding real numbers not representable by floating point numbers, represented as tight intervals with open bounds.

14. The non-transitory computer-readable media of claim 11, the operations further comprising excluding intervals with arbitrary boundary types and singleton values.

15. The non-transitory computer-readable media of claim 11, the operations further comprising restricting domains of floating points variables that are mathematically correct and independent of an underlying floating point library as long as the floating point library provides rounding control as required for interval arithmetic.

* * * * *